(12) United States Patent
Kawai et al.

(10) Patent No.: US 6,989,731 B1
(45) Date of Patent: Jan. 24, 2006

(54) NOTIFYING A USER THAT A WARNING STATUS HAS OCCURRED IN A DEVICE

(75) Inventors: Kenji Kawai, Tokyo (JP); Hiroo Edakubo, Yokohama (JP); Koji Takahashi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 388 days.

(21) Appl. No.: 09/628,336

(22) Filed: Jul. 28, 2000

(30) Foreign Application Priority Data

Jul. 30, 1999 (JP) ................................. 11-218081
Jul. 19, 2000 (JP) ............................. 2000-219334

(51) Int. Cl.
G05B 23/02 (2006.01)
G08B 29/00 (2006.01)
G08B 1/08 (2006.01)
G08B 21/00 (2006.01)
G08B 5/22 (2006.01)

(52) U.S. Cl. .................. 340/3.1; 340/506; 340/539.22; 340/540; 340/635; 340/825.36; 700/9

(58) Field of Classification Search ............... 340/7.32, 340/635, 8.1, 506, 825.36, 541, 825.25, 539.22, 340/540, 539.11, 3.1, 254; 370/254; 700/9; 368/10, 11, 12

See application file for complete search history.

(56) References Cited

U.S. PATENT DOCUMENTS

| 4,259,548 A | * | 3/1981 | Fahey et al. ................. 340/506 |
| 5,297,252 A | * | 3/1994 | Becker ........................ 340/506 |
| 5,537,104 A | * | 7/1996 | Van Dort et al. ....... 340/825.52 |
| 5,670,938 A | * | 9/1997 | Ohtani et al. ................ 340/506 |
| 5,706,191 A | * | 1/1998 | Bassett et al. .................. 700/9 |
| 5,748,078 A | * | 5/1998 | Escolar ........................ 340/506 |
| 5,973,592 A | * | 10/1999 | Flick ........................ 340/539.1 |
| 6,028,513 A | * | 2/2000 | Addy ..................... 340/539.22 |
| 6,147,601 A | * | 11/2000 | Sandelman et al. ......... 340/506 |
| 6,307,842 B1 | * | 10/2001 | Nakata et al. ......... 340/825.25 |

* cited by examiner

Primary Examiner—Brian Zimmerman
Assistant Examiner—Clara Yang
(74) Attorney, Agent, or Firm—Fitzpatrick, Cella, Harper & Scinto

(57) ABSTRACT

An electronic device detects whether a warning status has occurred and if the warning status is not released within a predetermined time, warning information is transmitted to a registered device. If the warning status is not released in spite of transmitting the warning information and if the user is not near the device, warning information is transmitted to one or more hand-held terminals in an external network according to predetermined order. If the warning status is released within a predetermined time having elapsed from the transmission of the warning information to the hand-held terminal, warning released information indicating that the warning status has been released is transmitted to the hand-held terminal.

10 Claims, 16 Drawing Sheets

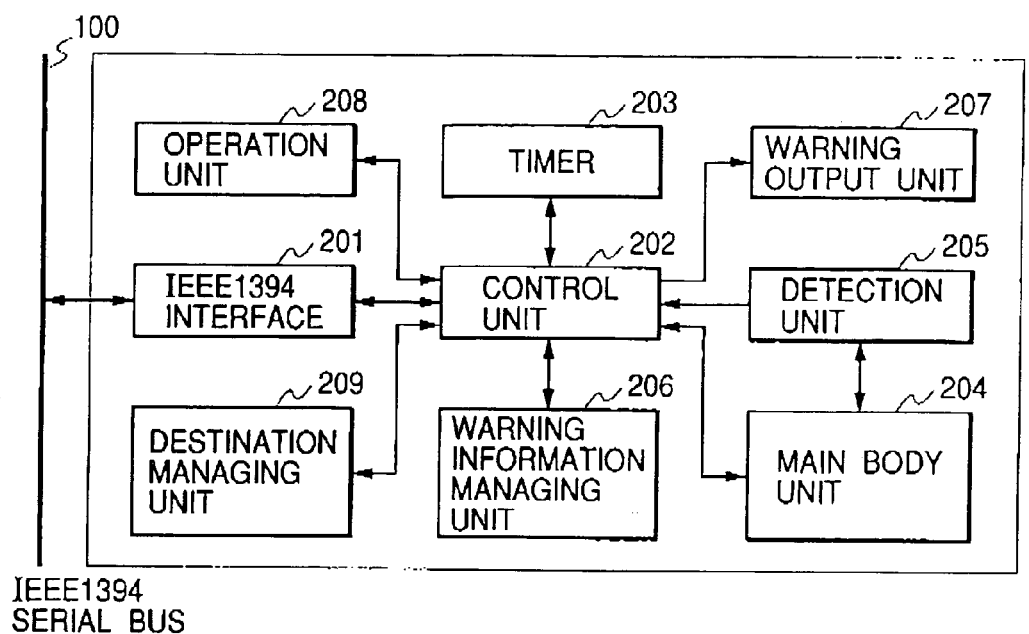

FIG. 19

| PRIORITY SEQUENCE | USER NAME | DESTINATION NUMBER | PASSWORD |
|---|---|---|---|
| — | DIGITAL TELEVISION | NODE ID=1 | — |
| 1 | FATHER | 010-1234-5678 | ABCD |
| 2 | FATHER | aaa@bbb.ccc.ddd | ABCD |
| 3 | MOTHER | 040-1234-5678 | EFGH |
| 4 | SISTER | 090-1234-5678 | IJKL |
| 5 | BROTHER | 090-8765-4321 | MNOP |
| % | MANAGEMENT COMPANY | 03-1234-3678 | QRST |

NOTIFYING A USER THAT A WARNING STATUS HAS OCCURRED IN A DEVICE

BACKGROUND OF THE INVENTION

1. Field of the Invention

The present invention relates to a technology for warning a user of changes in status (a completion of an operation, an occurrence of an extraordinary status or the like) arisen in an electronic device via other electronic devices connected to a network.

2. Related Background Art

An electronic device for use at a household (electronic device for home use) has been conventionally warning a user of a change in status (a completion of operations, an occurrence of an extraordinary status or the like) using a control element (for example, a light emitting element such as an LED, a displaying device such as a CRT and an LCD, a speaker). A user has been confirming the change in status of the device by visually confirming the control element held by a desired electronic device for home use or by auditorily confirming it.

However, if a desired electronic device for home use is located in a distant place from a user or is not in a user's room, there is a problem that the user cannot notice the change in status of the device instantly.

In addition, if a user wishes to know a change in status of a desired electronic device for home use, the user must always stay close to the device, which causes a problem that it is inconvenient to handle the device and the user is given a heavy burden. Further, in such a case, there is also a problem that a change in status of another device located in a different place cannot be noticed instantly.

Moreover, if a user wishes to know a change in status of a desired electronic device for home use when he/she is out, there is a problem that the user cannot confirm a change in status arising in the device.

SUMMARY OF THE INVENTION

An object of the present invention is to solve the above-described problems.

Another object of the present invention is to realize a technology for warning a user in a remote place from an electronic device of a change in status arising in the device.

As a preferred embodiment under such objects, a communication system in accordance with the present invention discloses (a) a first device for transmitting warning information indicating that a status that should be warned a user of is detected and (b) a second device for warning a user of the status of the first device based on the warning information, wherein the first device determines whether the status that should be warned a user of has been released or not after transmitting the warning information to the second device and, if the status that should be warned a user of has not been released, transmits the warning information to devices other than the second device.

As another embodiment, a method for controlling a communication system in accordance with the present invention discloses the steps of (a) transmitting warning information indicating that a status that should be warned a user of is detected from a first device to a second device, (b) warning a user of the status of the first device based on the warning information and (c) determining whether the status that should be warned a user of has been released or not after transmitting the warning information to the second device and, if the status that should be warned a user of has not been released, transmitting the warning information to devices other than the second device.

As another embodiment, an electronic device in accordance with the present invention discloses (a) a detecting unit for detecting a status that should be warned a user of (b) a transmitting unit for transmitting warning information indicating that the status that should be warned a user of has been detected to a predetermined device connected to a digital network and (c) a controlling unit for determining whether the status that should be warned a user of has been released or not after transmitting the warning information to the predetermined device, wherein, if the status that should be warned a user of has not been released, the transmitting unit transmits the warning information to devices other than the predetermined device.

As another embodiment, a method for controlling an electronic device in accordance with the present invention discloses the steps of (a) detecting a status that should be warned a user of, (b) transmitting warning information indicating that the status that should be warned a user of has been detected to a predetermined device connected to a digital network, (c) determining whether the status that should be warned a user of has been released or not after transmitting the warning information to the predetermined device, and (d) if the status that should be warned a user of has not been released, transmitting the warning information to devices other than the predetermined device.

Still other objects of the present invention, and the advantages thereof, will become fully apparent from the following detailed description of the embodiments.

BRIEF DESCRIPTION OF THE DRAWINGS

In the accompanying drawings,

FIG. 2 illustrates a basic configuration of electronic devices connected to the domestic network system, FIG. 3 illustrates an example of a warning function;

FIG. 19 illustrates an example of a management table for managing destinations for transmitting warning information.

DETAILED DESCRIPTION OF THE PREFERRED EMBODIMENTS

The preferred embodiments of the present invention will now be described in detail hereinafter with reference to the accompanying drawings.

First Embodiment

Figure 1:
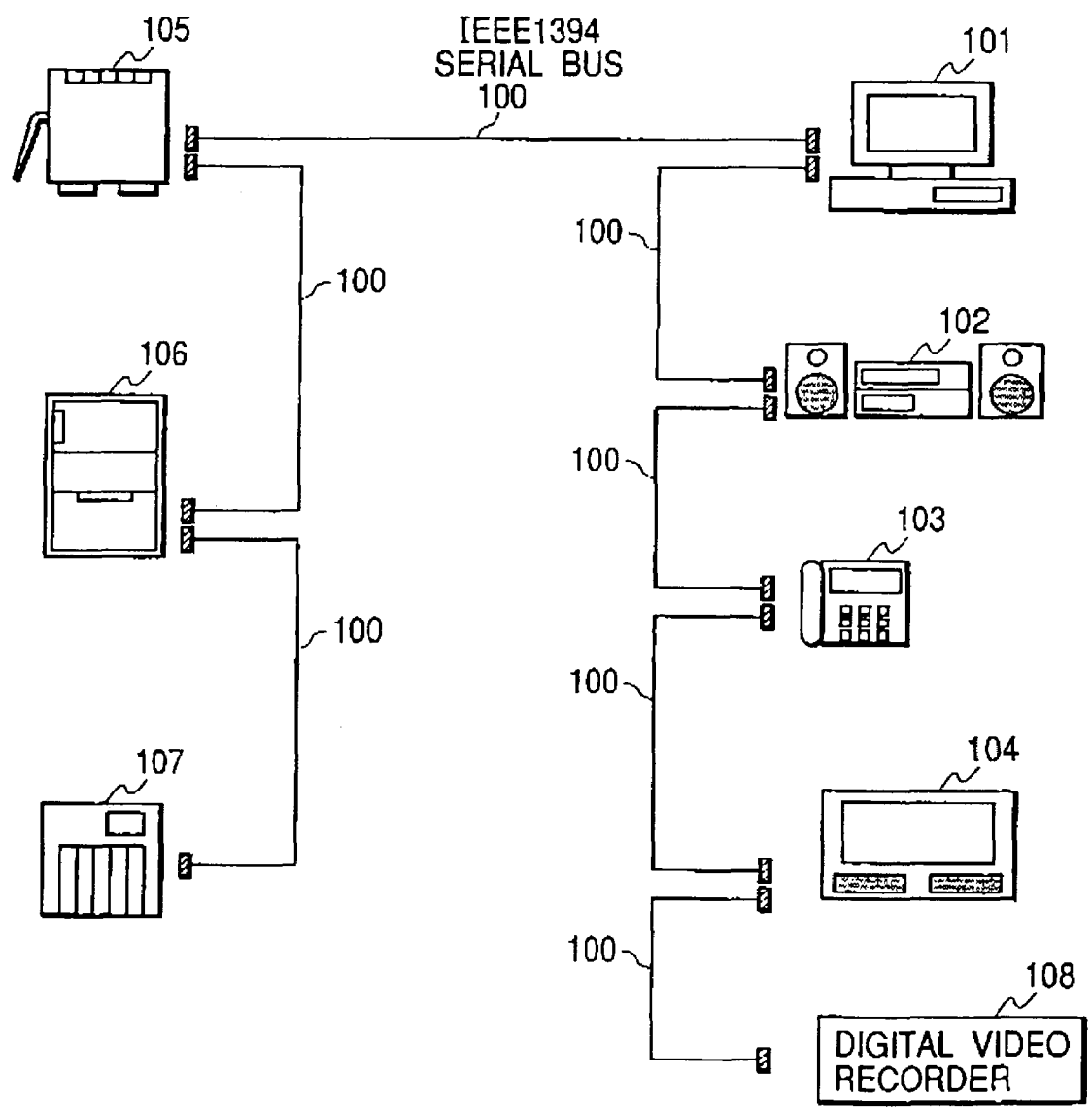
FIG. 1 illustrates an example of a domestic network system in a first embodiment.

FIG. 1 illustrates a domestic network system in a first embodiment. 101 denotes a personal computer, 102 denotes stereo equipment, 103 denotes a telephone with a monitor, 104 denotes a digital television receiver (hereinafter referred to as a digital television), 105 denotes an electronic washing machine, 106 denotes a refrigerator, 107 denotes a door phone, 108 denotes a digital video recorder and 100 denotes a digital network conforming to the IEEE1394-1995 standard and its extended standard (hereinafter referred to as IEEE1394 serial bus).

Each of the electronic devices 101 through 108 has the functions for transmitting warning information indicating the occurrence of a status of which a user has to be warned of (i.e., a warning event) to a device that a user registered in advance and for broadcasting the information over a domestic network. In addition, each of the electronic devices 101 through 108 has the functions for receiving warning information transmitted by another device and warning a user FIG. 2 illustrates a basic configuration of the electronic devices 101 through 108 composing the domestic network system in the first embodiment.

In FIG. 2, 201 denotes an IEEE1394 interface, 202 denotes a control unit, 203 denotes a timer, 204 denotes a main body unit, 205 denotes a detection unit, 206 denotes a warning information managing unit, 207 denotes a warning output unit, 208 denotes an operation unit and 209 denotes a destination managing unit.

The IEEE1394 interface 201 is a digital interface conforming to the IEEE1394-1995 standard and its extended standard. The control unit 202 includes a micro computer and a storing medium. The timer 203 times the passage of time in accordance with the instruction of the control unit 202. The detection unit 205 detects a change in status of the main body unit 204 using a plurality of sensors. The control unit 202 determines whether a status that should be warned a user of (i.e., a warning event) has occurred or not based on the output of each sensor held by the detection unit 205.

For example, in case of the refrigerator 106, the detection unit 205 has sensors such as a door sensor and a temperature sensor. The door sensor detects the open or closed status of the door and the temperature sensor detects the temperature status inside the refrigerator 106. If the open status of the door continues for a predetermined time or more or if the temperature inside the refrigerator 106 reaches a predetermined temperature or more, the control unit 202 determines that a warning event has occurred.

The warning information managing unit 206 manages a plurality of kinds of warning information. Each piece of warning information includes at least one of image data, text data and audio data representing the type and the contents of warning events.

The warning output unit 207 has a monitor (a CRT, an LCD monitor, a plasma display panel, etc.) and a speaker and warns a user of a warning event having occurred in itself or those having occurred in other electronic devices by means of at least one of images, characters and voices. In case of warning by images, still images, animation images and the like representing the type and the contents of the warning event are displayed on the monitor. In case of warning by characters, text messages and the like describing the type and the contents of the warning event are displayed on the monitor. In case of warning by voices, beep sounds, melodies, voice messages and the like corresponding to the type and the contents of the warning event are output from the speaker.

The operation unit 208 selects a desired device as a transmitting destination of the warning information out of the electronic devices 101 through 108 connected to the IEEE1394 serial bus 100 in accordance with the operation of a user. A management table managed by the destination managing unit 209 is registered in the transmitting destination selected by the operation unit 208.

Each of the electronic devices 101 through 108 has two operating modes, an on mode and a sleep mode. The on mode is an operating mode for performing an ordinary operation. On the other hand, the sleep mode is an operating mode with more restricted power consumption than the on mode (what is called a power saving mode). In case of the sleep mode, the control unit 202 stops a part of or substantially all of the functions of the main body unit 204 and reduces power consumption. Each of the electronic devices 101 through 108 automatically switches from the on mode to the sleep mode if no operation is received from a user for a predetermined time or more. Further, in the first embodiment, the case in which all of the electronic devices 101 through 108 are in the on mode is described.

FIG. 3 illustrates a warning function that each of the personal computer 101, the stereo equipment 102, the telephone 103 and the digital television 104 has. In FIG. 3, "O" denotes a warning function that can be coped with and "x" denotes a warning function that cannot be coped with.

Each of the personal computer 101 and the digital television 104 is capable of executing a warning by images, a warning by characters, a warning by voices and a warning by sounds. In addition, each of the stereo equipment 102 and the telephone 103 is capable of executing a warning by characters, a warning by voices and a warning by sounds.

Figure 4:
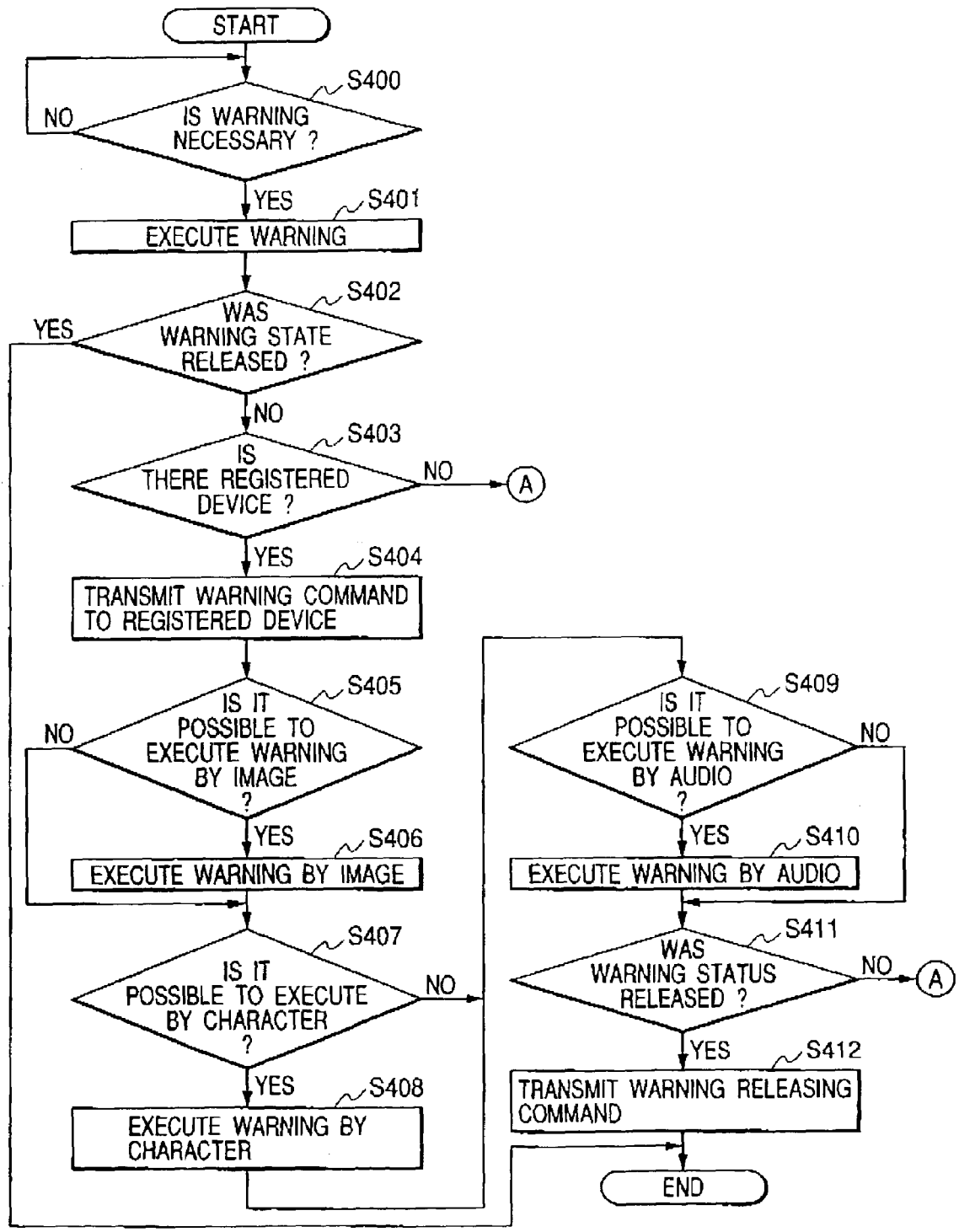
FIG. 4 is a flow chart showing an example of processing procedures of the domestic network system in the first embodiment.
Figure 5:
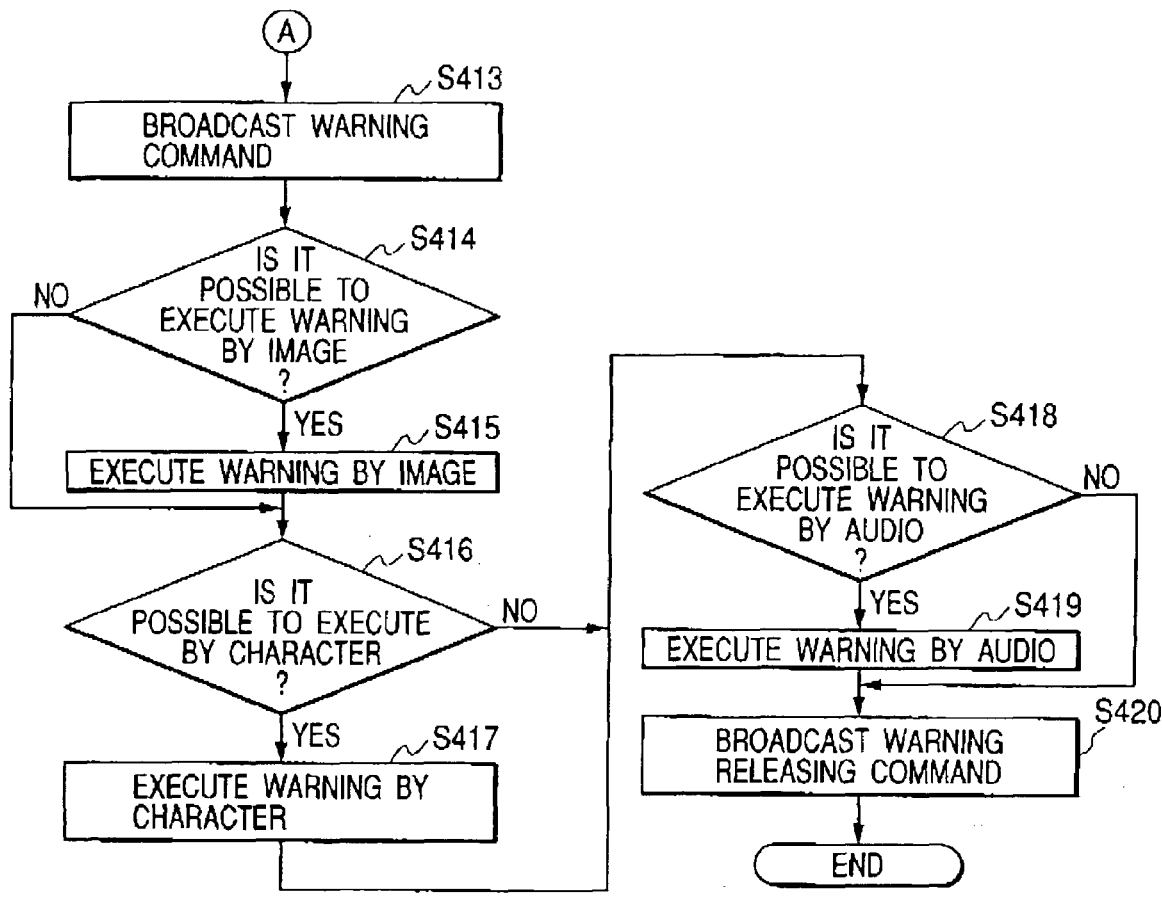
FIG. 5 is a flow chart showing an example of processing procedures of the domestic network system in the first embodiment.

FIGS. 4 and 5 are flow charts describing about processing procedures of the domestic network system in the first embodiment.

The control unit 202 of each of the electronic devices 101 through 108 first determines whether a status that should be warned a user of (i.e., a warning event) has occurred or not based on an output of each sensor held by the detection unit 205 (step S400).

If a warning even has occurred, each of the electronic devices 101 through 108 warns using its own warning output unit 207 (step S401). The control unit 202 determines whether the warning status has been released or not within a predetermined time (step S402). If the warning status has been released within a predetermined time, the control unit 202 finishes the processing.

On the other hand, if the warning status has not been released in a predetermined time, each of the electronic devices 101 through 108 determines that a user is not near it and, checks the management table of the destination management unit 209 and determines whether there are registered devices or not (step S403).

If it is determined that there are registered devices, each of the electronic devices 101 through 108 transmits a warning command to each registered device (step S404). Warning information corresponding to the warning event is set in the warning command. If there is no registered device, processing of step S413 and subsequent processing are performed.

Figure 6:
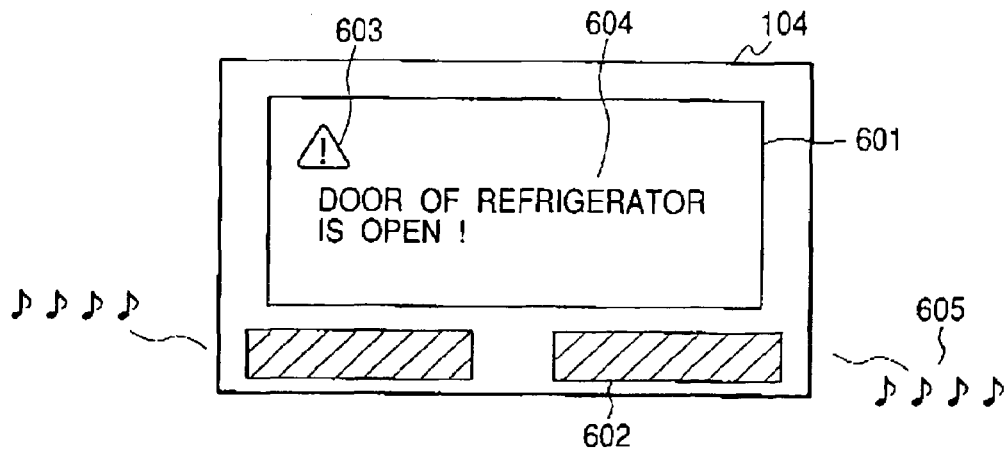
FIG. 6 illustrates an example of warning when an refrigerator is open.

The registered device having received the warning command, determines whether a warning by images is possible or not (step S405). If a warning by images is possible, the warning output unit 207 displays still images, animation images and the like representing the type and the contents of the warning event using image data contained in the warning information (step S406). An example of the digital television 104 warning a user of a warning event having occurred in the refrigerator 106 (displaying "DOOR OF REFRIGERATOR IS OPEN") is shown in FIG. 6. In case of a warning by images, the digital television 104 displays animation image 603 indicating "DOOR OF REFRIGERATOR IS OPEN" on the display unit 601.

The registered device then determines whether a warning by characters is possible or not (step S407). If a warning by characters is possible, the warning output unit 207 displays a text message and the like describing the type and the contents of the warning event on the monitor using text data contained in the warning information (step S408). An example of the digital television 104 warning a user of a warning event having occurred in the refrigerator 106 (displaying "DOOR OF REFRIGERATOR IS OPEN") is shown in FIG. 6. In case of a warning by characters, the digital television 104 displays a text message 604 indicating "DOOR OF REFRIGERATOR IS OPEN" on the display unit 601.

The registered device then determines whether a warning by voices is possible or not (step S409). If a warning by voices is possible, the warning output unit 207 outputs beep sounds, melodies, voice messages and the like corresponding to the type and the contents of the warning event from the speaker using audio data contained in the warning information (step S410). An example of the digital television 104 warning a user of a warning event having occurred in the refrigerator 106 (displaying "DOOR OF REFRIGERATOR IS OPEN") is shown in FIG. 6. In case of a warning by voices, the digital television 104 outputs a melody 605 indicating "DOOR OF REFRIGERATOR IS OPEN" from the speaker 602.

Each of the electronic devices 101 through 108 determines whether the warning status has been released or not from the time when the warning command was sent to each registered device until a predetermined times has passed (step 5411). If the warning status has been released until the passage of the predetermined time, each of the electronic devices 101 through 108 transmits a warning releasing command indicating that the warning status has been released to the registered device and finishes the processing (step S412).

If it is determined that there is no registered device (step S403) or if the warning status has not been released until the passage of the predetermined time (step S411), each of the electronic devices 101 through 108 broadcasts the above-mentioned warning command and transmits the above-mentioned warning command to the devices other than the registered devices (step S413).

The device receiving the warning command determines whether a warning by images is possible or not (step S414). If a warning by images is possible, the warning output unit 207 displays still images, animation images and the like representing the type and the contents of the warning event on the monitor using image data contained in the warning information (step S415).

The device then determines whether a warning by characters is possible (step S416). If a warning by characters is possible, the warning output unit 207 displays a text message and the like describing the type and the contents of the warning event on the monitor using text data contained in the warning information (step S417).

The device then determines whether a warning by voices is possible or not (step S418). If a warning by voices is possible, the warning output unit 207 outputs beep sounds, melodies, voice messages and the like corresponding to the type and the contents of the warning event from the speaker using audio data contained in the warning information (step S419).

After the warning status has been released, each of the electronic devices 101 through 108 broadcasts a warning releasing command indicating that the warning status has been released and finishes the processing (step S420).

As described above, in accordance with the domestic network system in the first embodiment, each of the electronic devices 101 through 108, upon detecting that a status that should be warned a user of (i.e., a warning event) has been occurred, can notify a user of the occurrence of the warning event in accordance with the order of (1) the device itself that detected the warning event, (2) registered devices registered in the device that detected the warning event and (3) electronic devices other than the registered devices. By configuring the system in this way, a user in a distant place from a device can be certainly warned of changes in the status having occurred in the device.

Figure 7:
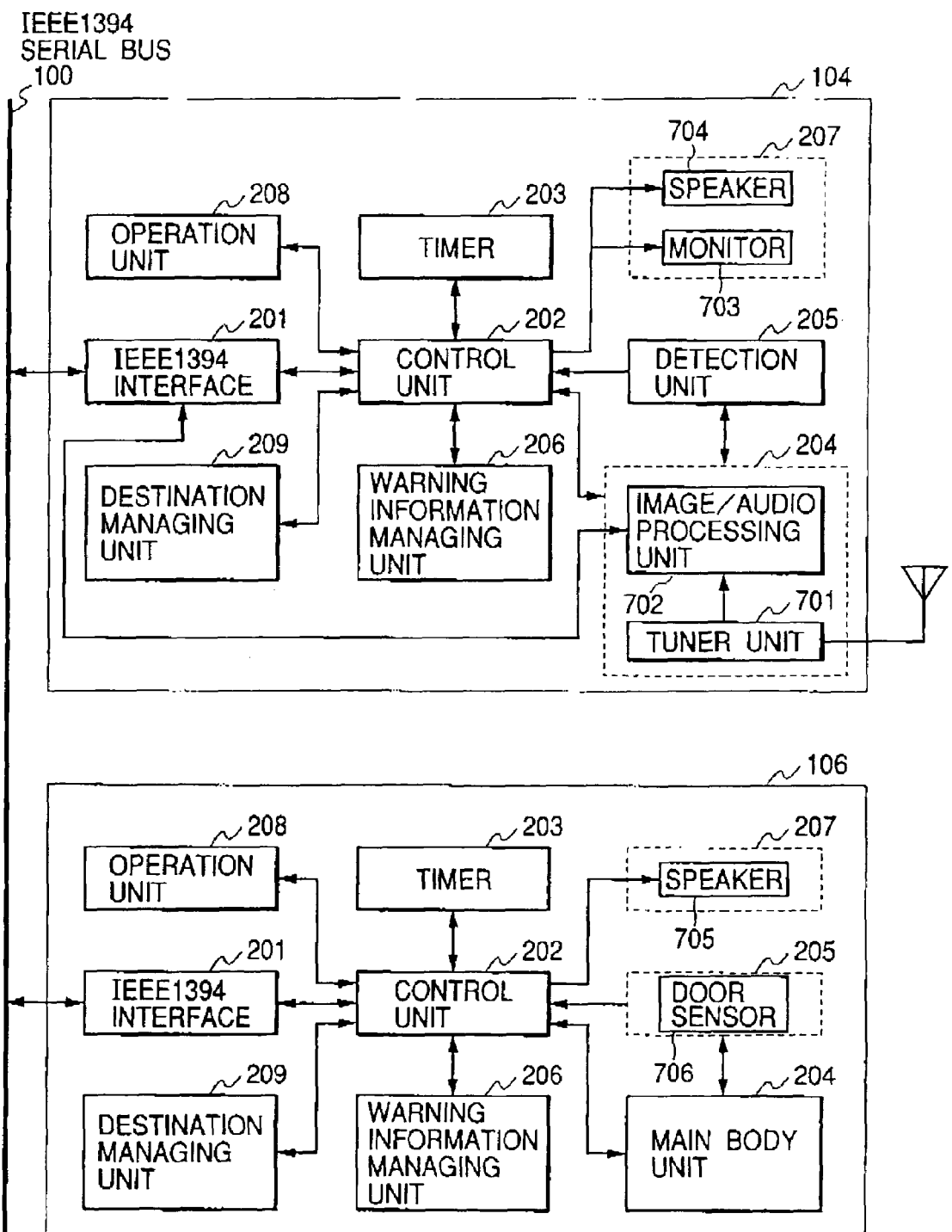
FIG. 7 is a block diagram showing an example of internal structures of a digital television and a refrigerator.

Procedures for warning a user of a warning event having occurred in the refrigerator 106 from the digital television 104 being a registered device of the refrigerator 106 will now be described with reference to FIG. 7. FIG. 7 is a block diagram describing in details the configurations of the digital television 104 and the refrigerator 106.

In FIG. 7, 701 denotes a tuner unit for receiving analog television broadcasting, digital television broadcasting, cable television broadcasting or the like, 702 denotes an image/audio processing unit for processing images and audio signals supplied from the tuner unit 701 or the IEEE1394 interface 201, 703 denotes a monitor for executing a warning by images and a warning by characters, 704 denotes a speaker for executing a warning by voices. In addition, 705 denotes a door sensor for detecting the open and closed status of the door of the refrigerator 106 and 706 denotes a speaker for executing a warning by voices.

The control unit 202 times the duration of time when the door of the refrigerator 106 opens based on the output of the door sensor 705. After detecting that the door opens for a predetermined time or more, the control unit 202 executes a warning by voices using the speaker 705 and warns a user of the current status of the refrigerator 106.

If it is determined that the warning status has not been released after the passage of a predetermined time since the beginning of the warning, the control unit 202 reads out warning information held by the warning information managing unit 206 and supplies the read out warning information to the IEEE1394 interface circuit 201. The IEEE1394 interface circuit 201 generates a warning command in which the warning information is set and asynchronously transfers the generated warning command to the digital television 104.

The IEEE1394 interface circuit 201 receives the asynchronously transferred warning command and supplies the warning information set in the received warning command to the control unit 202. The control unit 202 executes a warning by images or characters using the monitor 703 as shown in FIG. 6 and executes a warning by voices using the speaker 704. Further, the timing for outputting each of a warning by images, a warning by characters and a warning by voices is controlled by the control unit 202 based on supplementary information set in the warning command.

With the above-mentioned procedures, the digital video television 104 being a registered device of the refrigerator 106 can warn a user of the opened status of the door of the refrigerator 106.

Figure 8:
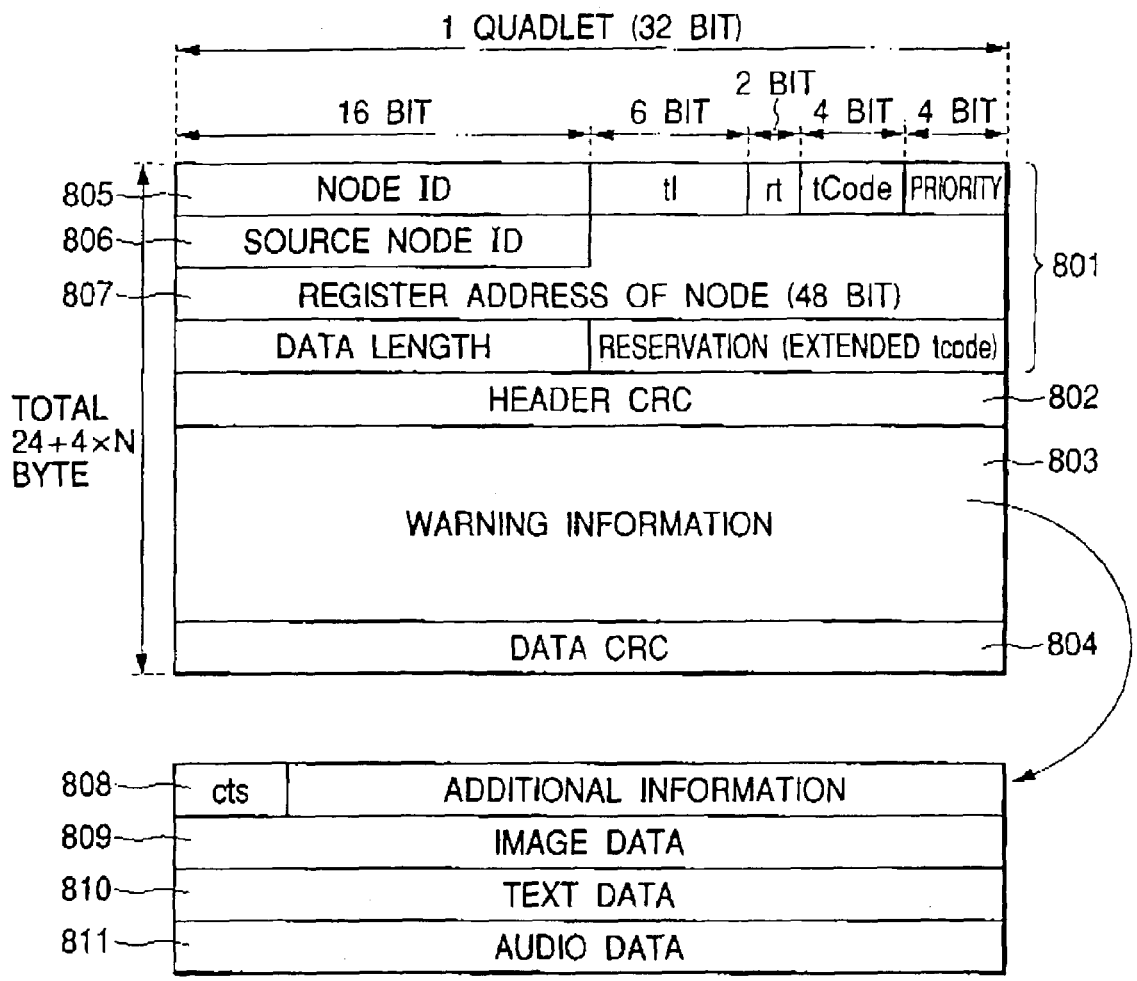
FIG. 8 illustrates a packet format of a warning command.

FIG. 8 illustrates an example of a packet format of the warning command of the first embodiment. The packet shown in FIG. 8 conforms to the asynchronous transfer packet of the IEEE1394-1995 standard.

In FIG. 8, 801 denotes a header portion, 802 denotes a CRC of the header portion, 803 denotes data portion and 804 denotes a CRC of the data portion.

805 denotes a destination node ID field and sets a node ID of a destination device. If a warning command is transmitted to a registered device, a node ID of the registered device is set. In addition, if a warning command is broadcast, a code "$FFFF_{16}$" indicating broadcast is set. 806 denotes a source node ID field and sets a node ID of the device to which the warning command is transmitted. 807 denotes a register address field and designates where in the address space held by the IEEE1394 interface the warning information set in the data portion 803 is sent to.

808 denotes a control data field and sets supplementary information for controlling the warning information. 809 denotes an image data field and sets image data representing the type and the contents of the warning event. 810 denotes a text data field and sets text data describing the type and the contents of the warning event 811 denotes an audio data field and sets audio data corresponding to the type and the contents of the warning event.

Figure 9:
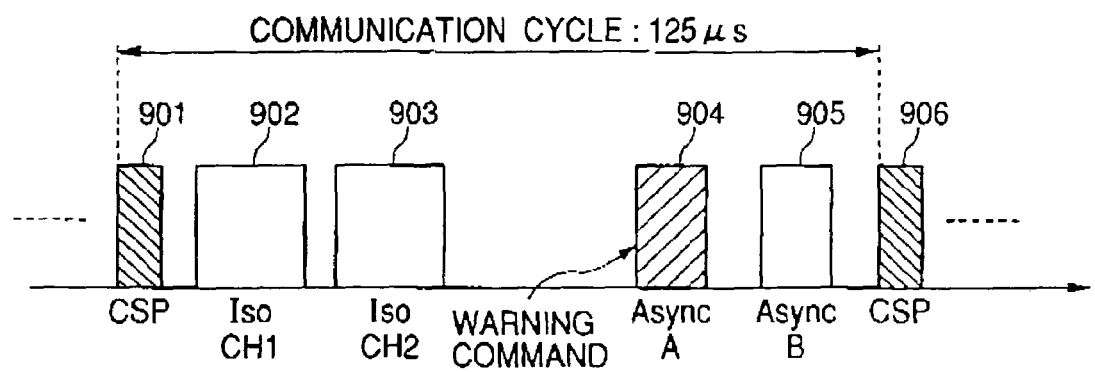
FIG. 9 illustrates an example of asynchronously transferring the warning command.

FIG. 9 explains the timing for transmitting the warning command shown in FIG. 8.

The IEEE1394 interface 201 of each of the electronic devices 101 through 108 executes two types of data transfer method (the isochronous transfer method and the asynchronous transfer method) in time division. The isochronous transfer method is a transfer method suitable for the transfer of video data, audio data and the like. With the isochronous transfer method, a predetermined amount of data is broadcast at a substantially constant data rate using communication bands and communication channels assigned for each communication cycle (one cycle is usually 125 i sec). The asynchronous transfer method is executed between the finish of the transfer period of the isochronous transfer packet and the beginning of the next communication cycle. The asynchronous transfer method is a transfer method for transferring control commands, data files and the like.

In FIGS. 9, 901 and 906 denote CSPs (cycle start packets) and are transferred at the start of each communication channel. The CSPs 901 and 906 are broadcast and adjust the time timed by the IEEE1394 interface 201 of each of the electronic devices 101 through 108. 902 and 903 denote packets to be asynchronously transferred. 904 and 905 denote packets to be asynchronously transferred. The warning command shown in FIG. 8 is transferred between the finish of the transfer period of the isochronous transfer packet 902 and 903 and the time the CSP 906 is transferred (i.e., the packet 904).

Further, a warning information is configured to be broadcast using the asynchronous transfer method in the first embodiment, but a warning information can be configured to be broadcast using the isochronous transfer method.

Second Embodiment

In the first embodiment, the case in which all the electronic devices 101 through 108 are in the on mode is described. In the second embodiment, the case in which at least one of the electronic devices 101 through 108 is in the sleep mode will be hereinafter described.

Figure 10:
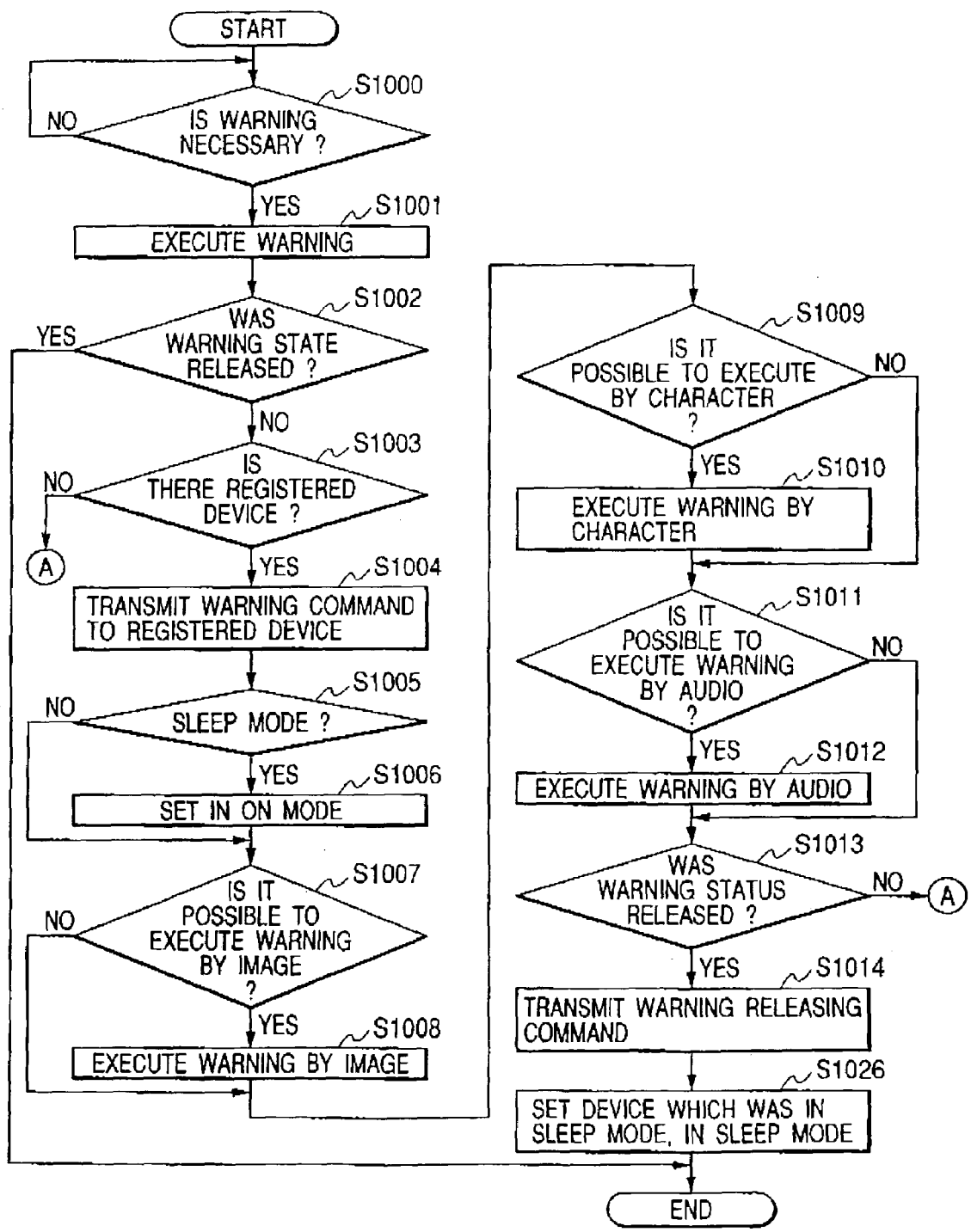
FIG. 10 is a flow chart showing an example of processing procedures of a domestic network system in a second embodiment.
Figure 11:
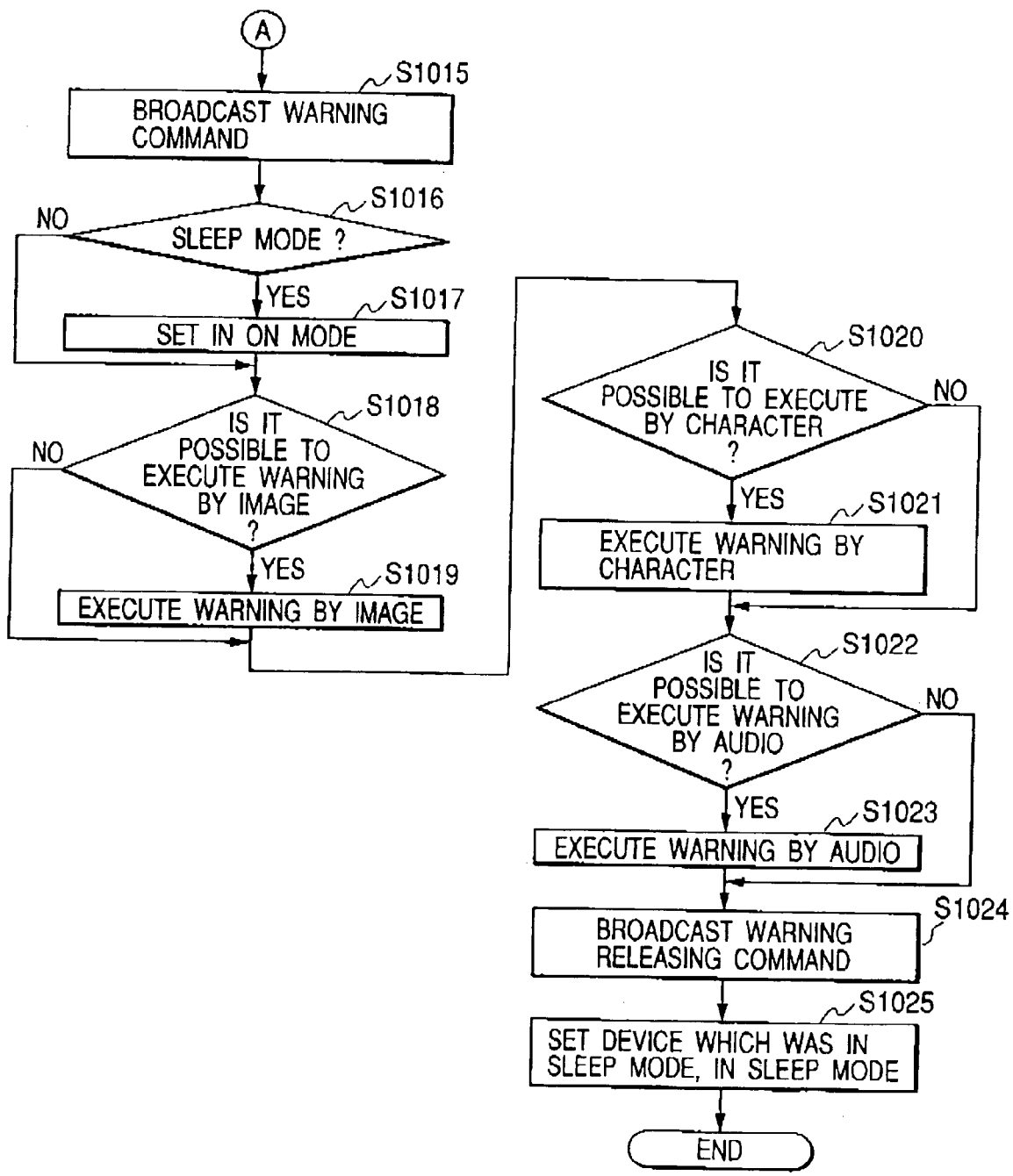
FIG. 11 is a flow chart showing an example of processing procedures of the domestic network system in the second embodiment.
Figure 12:
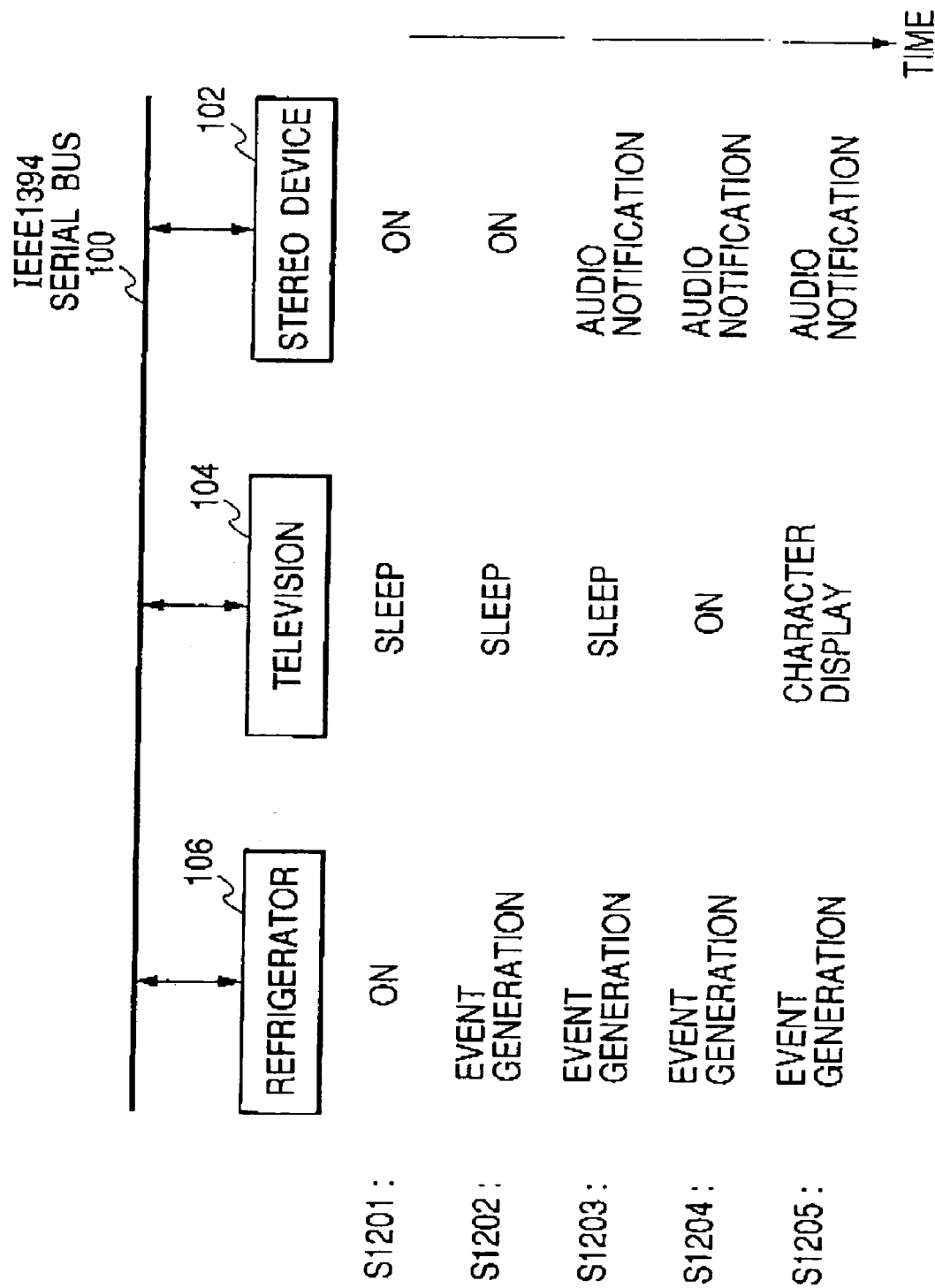
FIG. 12 illustrates changes with time of the operational status of a plurality of electronic devices.
Figure 13:
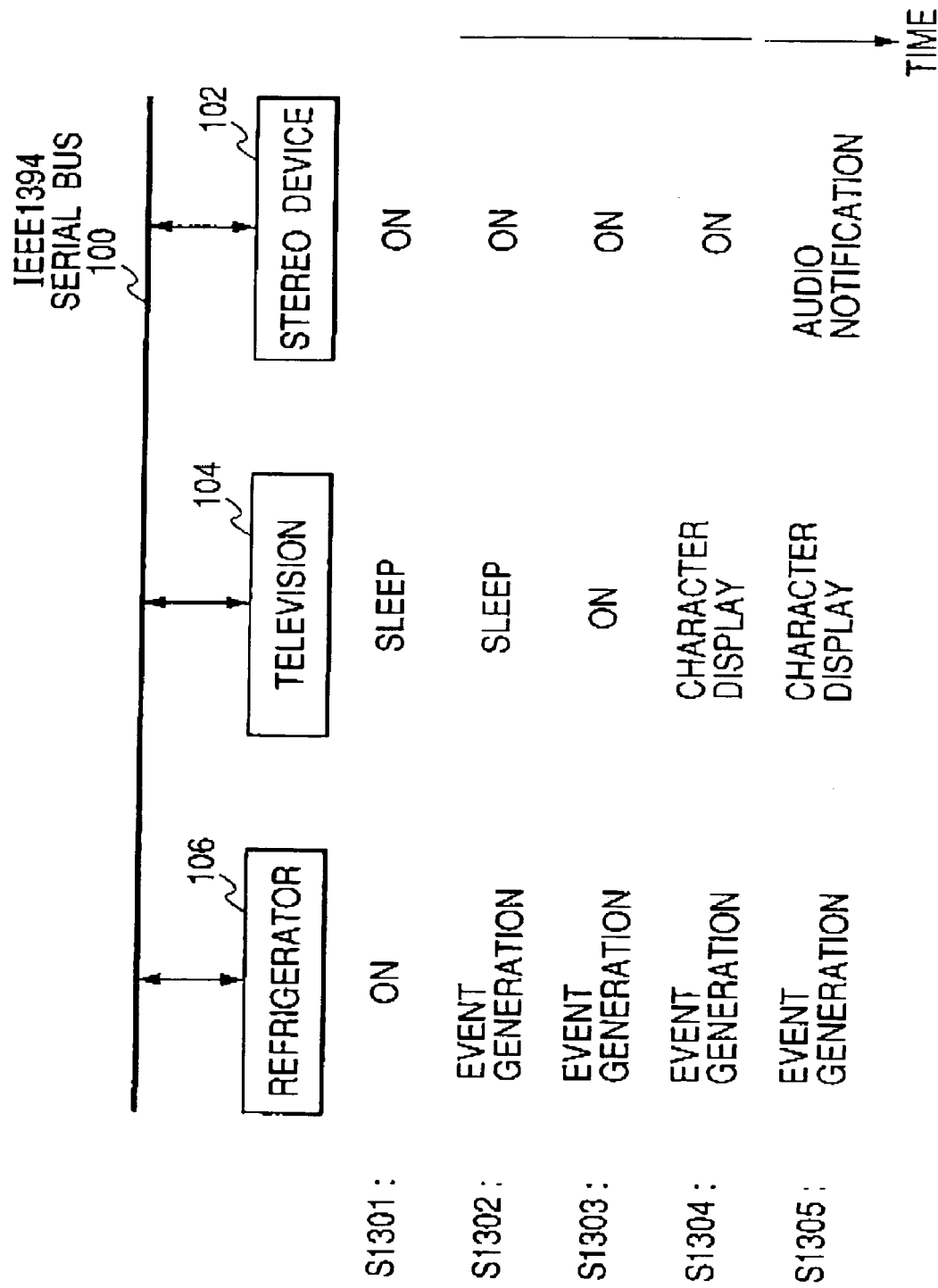
FIG. 13 illustrates changes with time of the operational status of the plurality of electronic devices.
Figure 14:
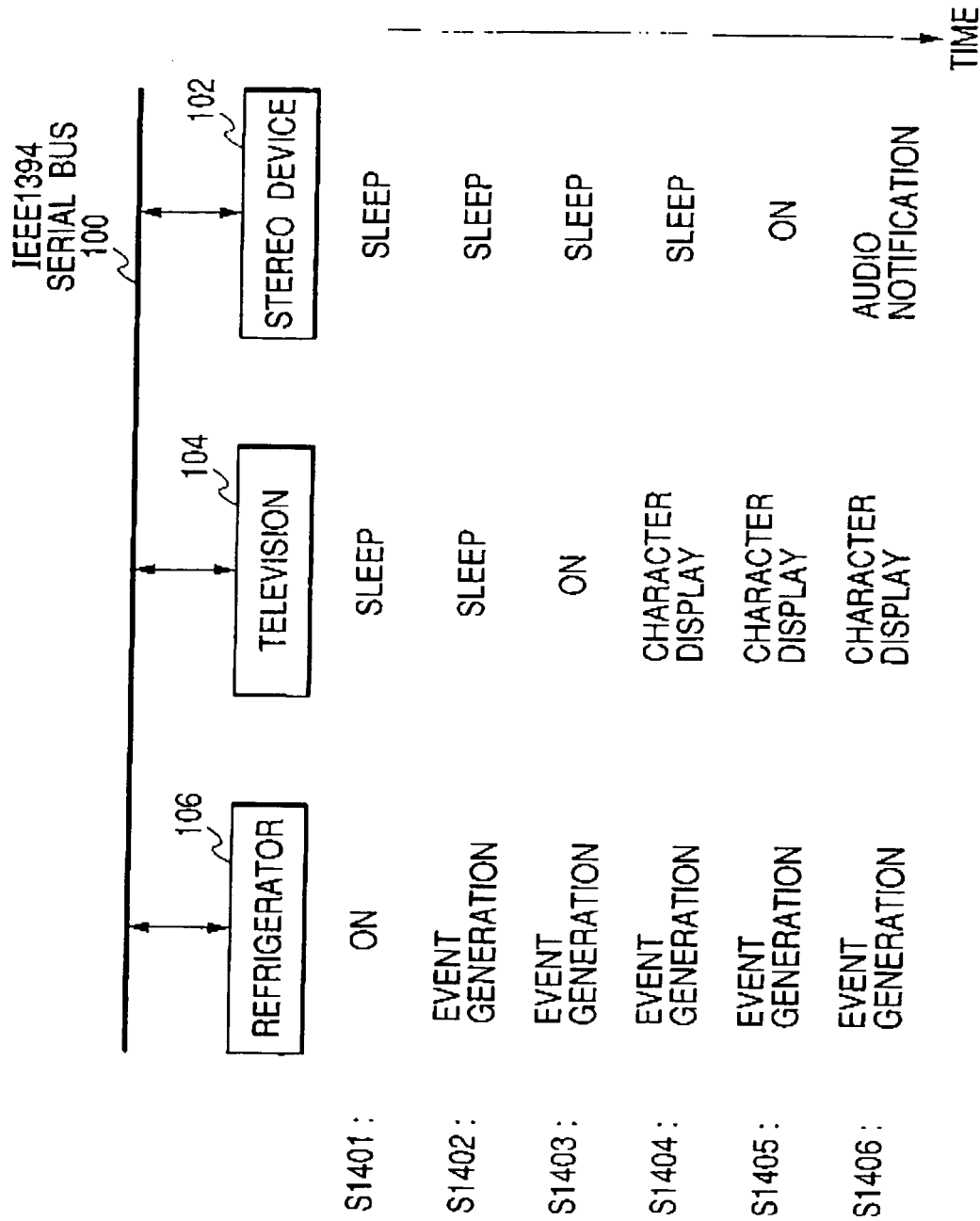
FIG. 14 illustrates changes with time of the operational status of the plurality of electronic devices.

FIGS. 10 and 11 are flow charts describing processing procedures of the domestic network system in the second embodiment. FIGS. 12, 13 and 14 illustrate the changes with time of the operational statuses of the stereo equipment 102, the digital television 104 and the refrigerator 106. In FIG. 12, an example in which the operational mode of the refrigerator 106 and the stereo equipment 102 is the on mode and the operational mode of the digital television 104 is the sleep mode is described (S1201). In addition, in FIG. 13, an example in which the operational mode of the refrigerator 106 and the stereo equipment 102 is the on mode and the operational mode of the digital television 104 is the sleep mode is described (S1301). Further, in FIG. 14, an example in which the operational mode of the refrigerator 106 is the on mode and the operational mode of the digital television 104 and the stereo equipment 102 is the sleep mode is described (S1401).

The control unit 202 of each of the electronic devices 101 through 108 first determines whether a status that should be warned a user of (i.e., a warning event) has occurred or not based on the output of each sensor held by the detection unit 205 (step S1000).

If a warning event has occurred, each of the electronic devices 101 through 108 warns of the event using its own warning output unit 207 (step S1001). In FIGS. 12, 13 and 14, the refrigerator 106 detects the occurrence of a warning event and warns of it (S1202, S1302, S1402). The control unit 202 determines whether the warning status has been released or not within the predetermined time (step S1002). If the warning status has been released within the predetermined time, the control unit 202 finishes the processing.

On the other hand, if the warning status has not been released after the passage of the predetermined time, each of the electronic devises 101 through 108 determines that a user is not near by. Then, the device checks the management table of the destination managing unit 209 and determines whether there is a registered device or not (step S1003). In FIG. 12, the stereo equipment 102 is a registered device registered in the refrigerator 106. On the other hand, in FIGS. 13 and 14, the digital television 104 is a registered device registered in the refrigerator 106.

If it has been determined that there is a registered device, each of the electronic devices 101 through 108 transmits a warning command to each registered device (step S1004). Warning information corresponding to the warning event is set in this warning command. If there is no registered device, processing of the step S1015 and the subsequent processing are executed.

The registered device having received the warning command determines whether its own operational mode is the on mode or the sleep mode (step S1005). The registered device determining that the mode is the sleep mode automatically changes its own operational mode to the on mode (step S1006). In FIG. 12, an example in which the stereo equipment 102 being a registered device is in the on mode is shown (S1202). On the other hand, in FIGS. 13 and 14, an example in which the digital television 104 being a registered device changes its own operational mode from the sleep mode to the on mode is shown (S1303, S1403).

The registered device having received the warning command determines whether a warning by images is possible or not (step S1007). If a warning by images is possible, the warning output unit 207 displays still images, animation images and the like representing the type and the contents of the warning event on the monitor using image data contained in the warning information (step S1008). In FIGS. 13 and 14, an example in which the digital television 104 being a registered device executes a warning by animation images is shown (S1304, S1404).

Then, the registered device determines whether a warning by characters is possible or not (step S1009). If a warning by characters is possible, the warning output unit 207 displays text messages and the like describing the type and the contents of the warning event on the monitor using text data contained in the warning information (step S1010).

Then, the registered device determines whether a warning by voices is possible or not (step S1011). If a warning by voices is possible, the warning output unit 207 outputs beep sounds, melodies, voice messages and the like corresponding to the type and the contents of the warning event from the speaker using audio data contained in the warning information (step S1012). In FIG. 12, an example in which the stereo equipment 102 being a registered device executes a warning by voice messages is shown (Sl204).

Each of the electronic devices 101 through 108 determines whether the warning status has been released or not since the transmission of the warning command to each registered device until the passage of the predetermined time (step S1013). If the warning status has been released until the predetermined time passes, each of the electronic devices 101 through 108 transmits a warning releasing command indicating that the warning status has been released to the registered device (step S014). The registered device with the sleep mode as the operational mode prior to receiving the warning command changes its own operational mode to the sleep mode again after receiving the warning releasing command (step S1026).

If it has been determined that there is no registered device (step 51003) or if the warning status has not been released after the passage of the predetermined time (step S1013), each of the electronic devices 101 through 108 broadcasts the above-mentioned warning command in order to transmit the above-mentioned command to the devices other than the registered device (step S1015).

The device having received the warning command determines whether its own operational mode is the on mode or the sleep mode (step S1016). The registered device determining that the mode is the sleep mode automatically changes its own operational mode to the on mode (step S1017). In FIG. 12, an example in which the digital television 104 being one of the devices other than the registered device changes its own operational mode from the sleep mode to the on mode is shown (S1304). In FIG. 13, an example in which the stereo equipment 102 being one of the devices other than the registered device is in the on mode is shown (S1404). In FIG. 14, an example in which the stereo equipment 102 being one of the devices other than the registered device changes its own operational mode from the sleep mode to the on mode is shown (S1405).

The device having received the warning command determines whether a warning by images is possible or not (step S1018). If a warning by images is possible, the warning output device 207 displays still images, animation images and the like representing the type and the contents of the warning event on the monitor using image data contained in the warning information (step S1019). In FIG. 12, an example in which the digital television 104 being one of the devices other than the registered device executes a warning by animation images is shown (S1205).

Then, the device determines whether a warning by characters is possible or not (step S1020). If a warning by characters is possible, the warning output device 207 displays text messages and the like describing the type and the contents of the warning event on the monitor using text data contained in the warning information (step S1021).

Then, the device determines whether a warning by voices is possible or not (step S1022). If a warning by voices is possible, the warning output unit 207 outputs beep sounds, melodies, voice messages and the like corresponding to the type and the contents of the warning event from the speaker (step S1023). In FIGS. 13 and 14, an example in which the stereo equipment 102 being one of the devices other than the registered device executes a warning by voice messages is shown (S1305, S1406).

After the warning status has been released, each of the electronic devices 101 through 108 broadcasts a warning-releasing command indicating that the warning status has been released (step S1024). The registered device with the sleep mode as the operational mode prior to receiving the warning command changes its own operational mode to the sleep mode again after receiving the warning releasing command (step S1025). Therefore, the device returns to the status of S1201 in FIG. 12, returns to the status of S1301 in FIG. 13 and returns to the status of S1401 in FIG. 14.

As described above, in accordance with the domestic network system of the second embodiment, each of the electronic devices 101 through 108, upon detecting that a status that should be warned a user of (i.e., a warning event) has occurred, can notify a user of the occurrence of the warning event in accordance with the order of (1) the device itself that detected the warning event, (2) registered devices registered in the device that detected the warning event and (3) electronic devices other than the registered devices. In addition, each of the electronic devices 101 through 108 is automatically switched to the on mode even if it is in the sleep mode and can notify a user of the occurrence of a warning event. With this configuration, a user in a distant place from a device can be certainly warned of changes in the status having occurred in the device.

Third Embodiment

In the first embodiment, an example in which a warning event having occurred in an electronic device is notified a user of from a registered device connected to a domestic network. In the third embodiment, an example in which a warning event having occurred in an electronic device is warned a user of from a registered device connected to an external network.

Figure 15:
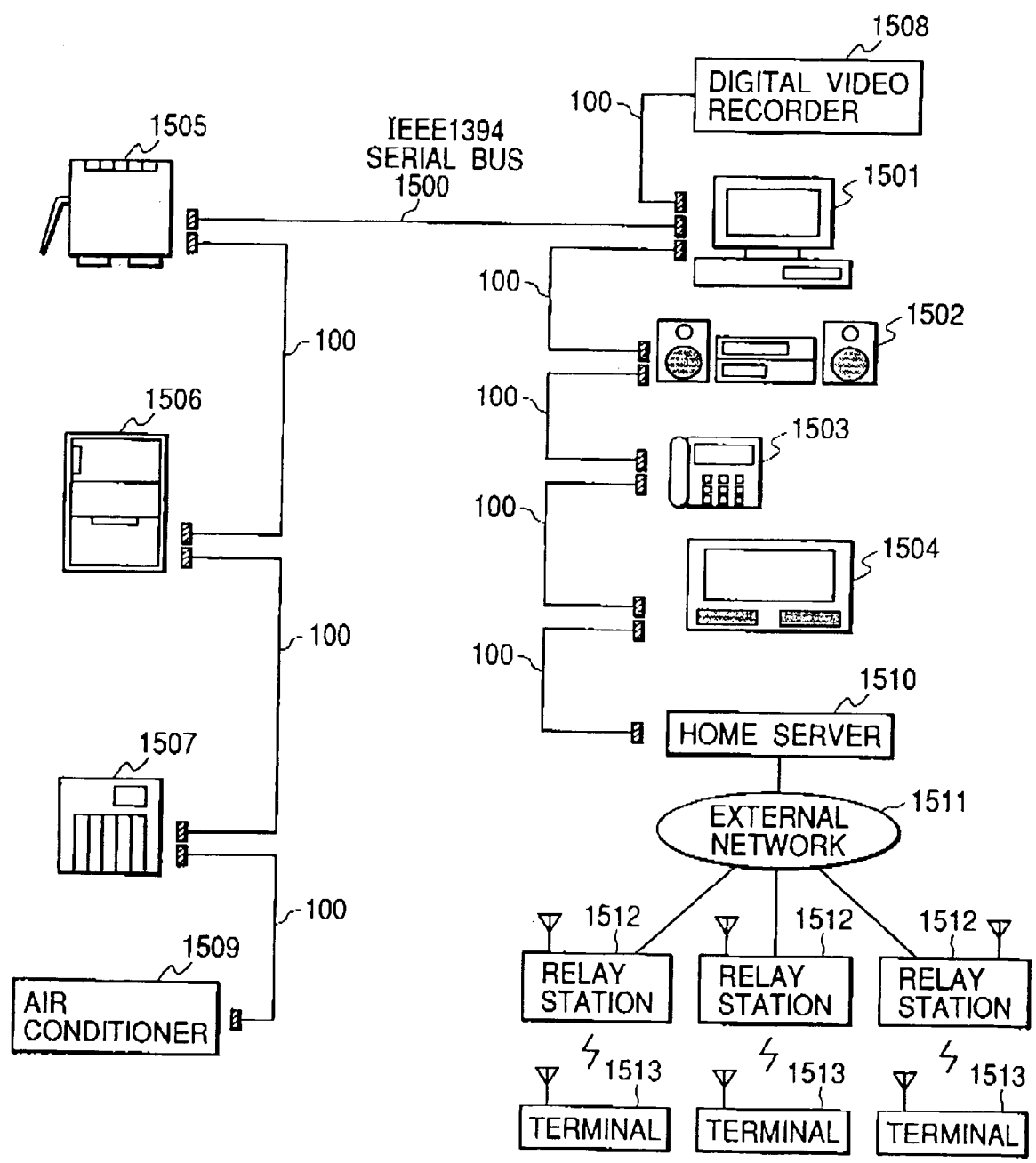
FIG. 15 illustrates an example of the domestic network system in the third embodiment.

FIG. 15 illustrates a domestic network system in the third embodiment.

1501 denotes a personal computer, 1502 denotes stereo equipment, 1503 denotes a telephone with a monitor, 1504 denotes a digital television receiver (hereinafter referred to as a digital television), 1505 denotes a washing machine, 1506 denotes a refrigerator, 1507 denotes a door phone, 1508 denotes a digital video recorder, 1509 denotes an air conditioner and 1510 denotes a home server. 1500 denotes a digital network (hereinafter referred to as the IEEE1394 serial bus) conforming to the IEEE1394-1995 standard and its extended standard (for example, IEEEP1394.a or IEEEP1394.b). 1511 denotes an external network utilizing a public network such as a telephone network and the internet, 1512 denotes a network relay station connected to the public network 1511 and 1513 denotes a hand-held terminal capable of communicating with the network relay station 1512.

Each of the electronic devices 1501 through 1509 has the function of transmitting warning information indicating that a status that should be warned a user of (i.e., a warning event) has occurred to a device registered by a user in advance and broadcasting it over a domestic network. Each of the electronic devices 1501 through 1509 has the function of receiving the warning information transmitted by other devices and warning a user of it in the similar manner as in the first embodiment.

The home server 1510 has the function of transmitting the warning information transferring the warning information transmitted from each of the electronic devices 1501 through 1509 connected to the domestic network to the hand-held terminal 1513 connected to the external network 1511.

Figure 16:
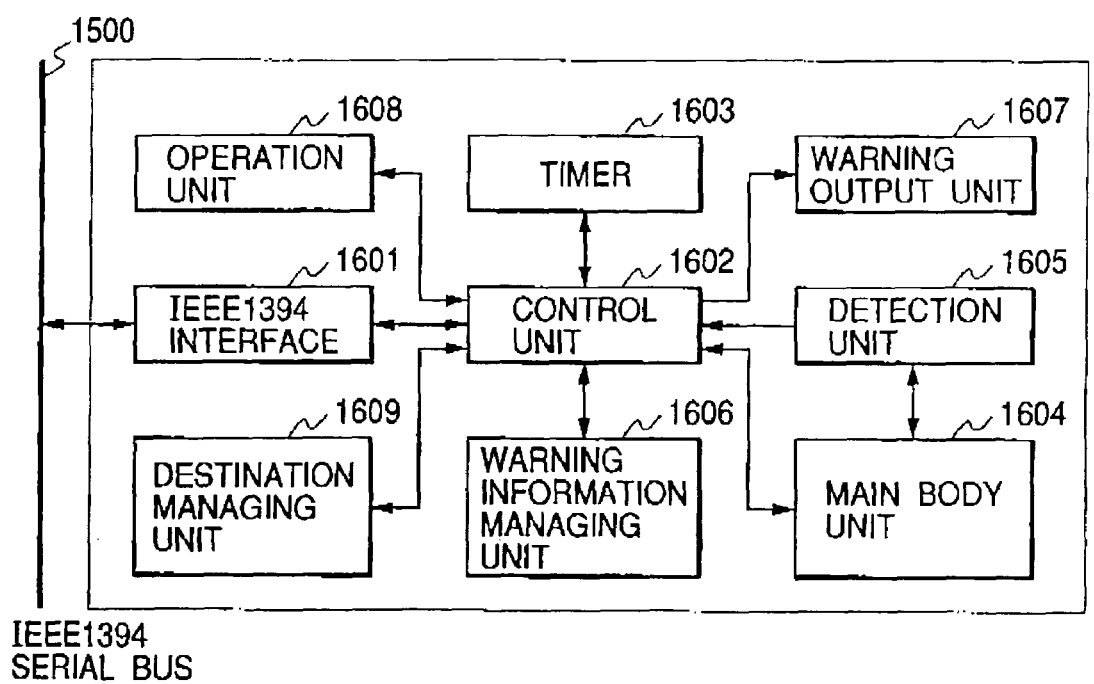
FIG. 16 illustrates a basic configuration of electronic devices connected to the domestic network system.

FIG. 16 illustrates the basis configuration of the electronic devices 1501 through 1509 forming the domestic network system in the third embodiment. Each of the electronic devices 1501 through 1509 has the on mode and the sleep mode as in the first embodiment.

In FIG. 16, 1601 denotes an IEEE1394 interface, 1602 denotes a control unit, 1603 denotes a timer, 1604 denotes a main body unit, 1605 denotes a detection unit, 1606 denotes a warning information managing unit, 1607 denotes a warning output unit, 1608 denotes an operation unit, 1609 denotes a destination managing unit and 1610 denotes a switch.

The IEEE1394 interface 1601 is a digital interface conforming to the IEEE1394-1995 standard and its extended standard. The control unit 1602 includes a microcomputer and a storage medium. The timer 1603 times in accordance with the instruction of the control unit 1602. The detection unit 1605 detects changes of the status of the main body unit 1604 using a plurality of sensors. The control unit 1602 determines whether a status that should be warned a user of (i.e., a warning event) has occurred or not based on an output of each sensor held by the detection unit 1605.

For example, in case of the refrigerator 1506, the detection unit 1605 has sensors such as a door sensor and a temperature sensor. The door sensor detects the open and closed status of the door and the temperature sensor detects the temperature status in the refrigerator 1506. The control unit 1602 determines that a warning event has occurred if the opening status of the door continues for a predetermined time or more or if the temperature in the refrigerator 1506 reaches a predetermined temperature or more. In addition, for example, in case of the air conditioner 1509, the detection unit 1605 has sensors such as a temperature sensor and an infrared ray sensor. The temperature sensor detects the temperature status in the room and the infrared ray sensor detects if a person is in the room. The control unit 1602 determines that a warning event has occurred if the temperature in the room reaches a predetermined temperature or more or if the status with no person in the room continues for a predetermined time or more.

The warning information managing unit 1606 manages a plurality of kinds of warning information. Each piece of warning information includes at least one of image data, text data and audio data representing the type and the contents of a warning event.

The warning output unit 1607 has a monitor (a CRT, an LCD monitor, a plasma display panel and the like) and a speaker, and warns of a warning event having occurred in itself or in other electronic devices by at least one of images, characters and voices. In case of a warning by images, still images, animation images and the like representing the type and the contents of the warning event are displayed on the monitor. In case of a warning by characters, text messages and the like representing the type and the contents of the warning event are displayed on the monitor. In case of a warning by voices, beep sounds, melodies, voice messages and the like corresponding to the type and the contents of the warning event are output from the speaker.

The operation unit 1608 selects a desired device as a transmitting destination of the warning information out of the electronic devices 1501 through 1509 connected to the IEEE1394 serial bus 1500. A management table managed by the destination managing unit 1609 registers the transmitting destination selected by the operation unit 1608. The operation unit 1608 further registers a desired terminal as a transmitting destination of the warning information out of the hand-held terminals 1513 connectable to the external network 1511 in accordance with the operation of a user. A management table managed by the destination managing unit 1609 registers the transmitting destination registered by the operating unit 1608.

An example of a management table managed by the destination managing unit 1609 will now be described with reference to FIG. 19. FIG. 19 illustrates an example in which the digital television 1504 connected to the IEEE1394 serial bus 1500, five hand-held terminals connectable to the external network 1511 and a management company having a contract with users are registered as transmitting destinations of a warning information. If the hand-held terminals are registered, a priority sequence showing the order of transmitting a warning information, user names of the hand-held terminals, destination numbers designating destinations, passwords for releasing the warning status and the like are input. Each of the electronic devices 1501 through 1509 transmits warning information in accordance with the priority sequence set in each hand-held terminal.

Figure 17:
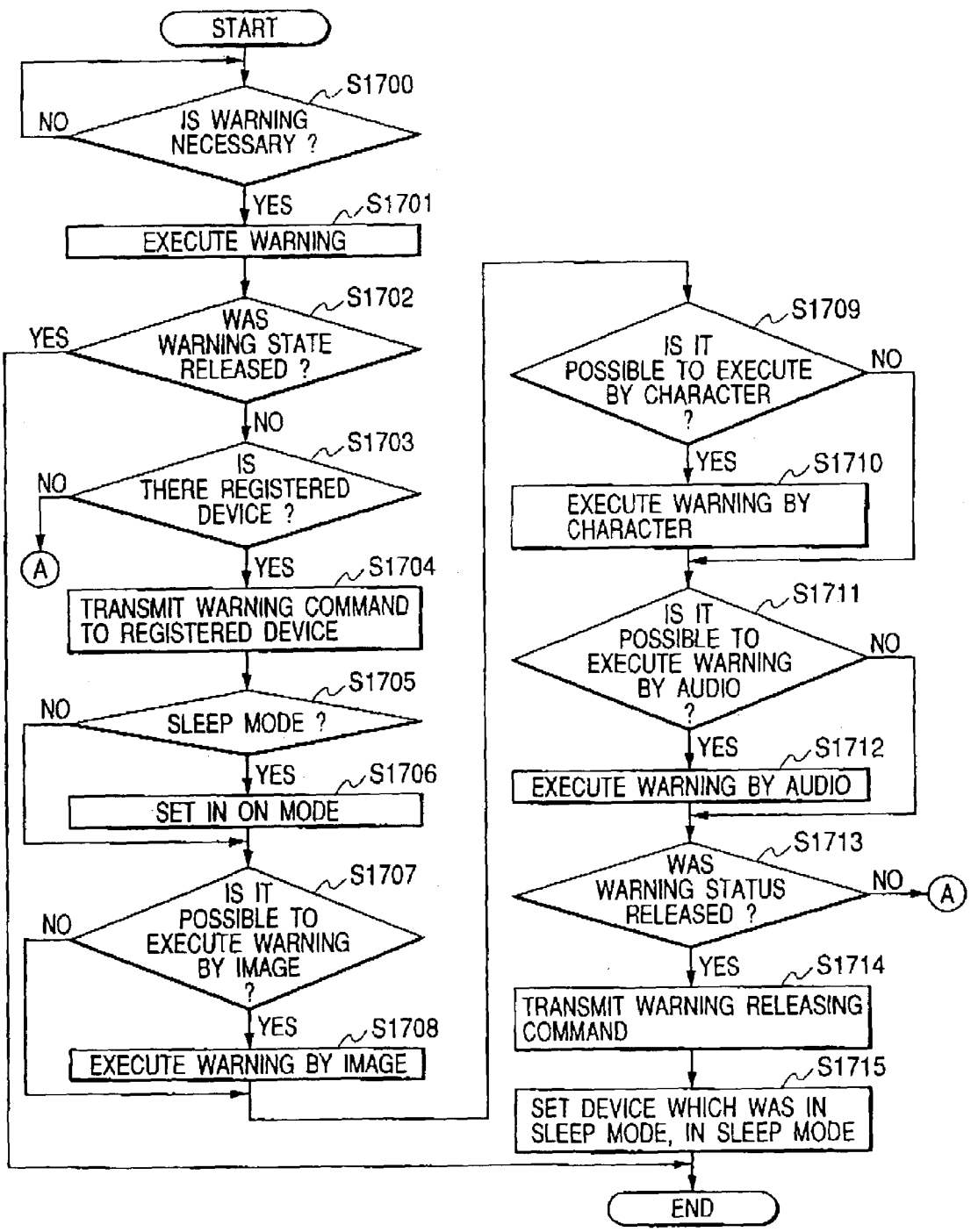
FIG. 17 is a flow chart showing an example of processing procedures of the domestic network system in the third embodiment.
Figure 18:
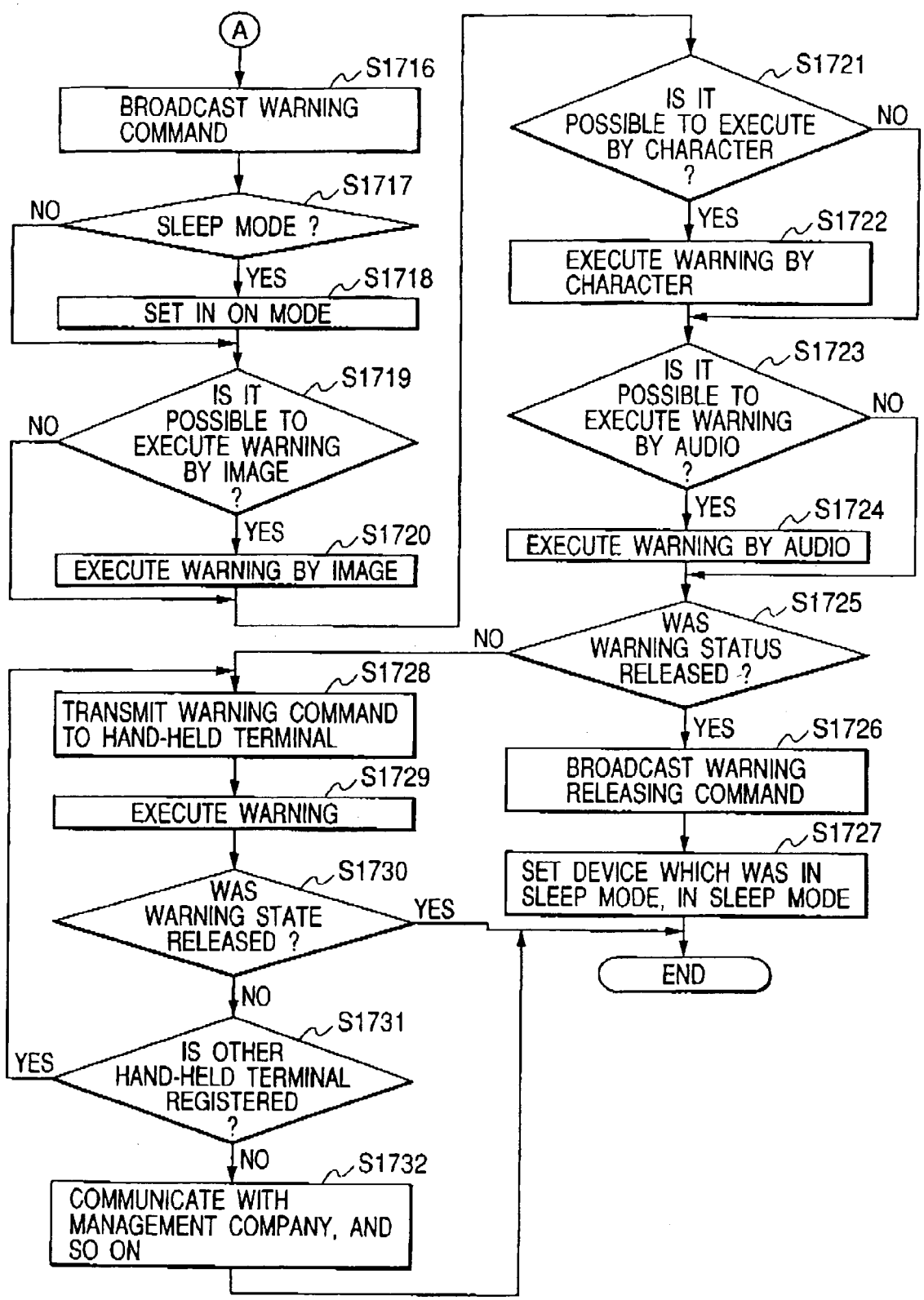
FIG. 18 is a flow chart showing an example of processing procedures of the domestic network system in the third embodiment.

FIGS. 17 and 18 are flow charts describing processing procedures of the domestic network system in accordance with the third embodiment.

Each of the electronic devices 1501 through 1509 first determines whether a status that should be warned a user of (i.e., a warning event) has occurred or not based on an output of each sensor held by the detection unit 1605 (step S1700).

If a warning event has occurred, each of the electronic devices 1501 through 1509 warns using its own warning output unit 1607 (step S1701). The control unit 1602 determines whether the warning status has been released or not within a predetermined time (step S1702). If the warning status has been released within a predetermined time, the control unit 1602 finishes the processing.

On the other hand, if the warning status has not been released in a predetermined time, each of the electronic devices 1501 through 1509 determines that a user is not near it and, checks the management table of the destination management unit 1609 and determines whether there are registered devices or not with the domestic network (step S1703).

If it is determined that there are registered devices, each of the electronic devices 1501 through 1509 transmits a warning command to each registered device (step S1704). Warning information corresponding to the warning event is set in the warning command. If there is no registered device, processing of step S1715 and subsequent processing are performed.

The registered device having received the warning command determines whether its own operational mode is the on mode or the sleep mode (step S1705). The registered device determining that the mode is the sleep mode automatically changes its own operational mode to the on mode (step S1706).

The registered device having received the warning command determines whether a warning by images is possible or not (step S1707). If a warning by images is possible, the warning output unit 1607 displays still images, animation images and the like representing the type and the contents of the warning event on the monitor using image data contained in the warning information (step S1708).

The registered device then determines whether a warning by characters is possible or not (step S1709). If a warning by characters is possible, the warning output unit 1607 displays a text message and the like describing the type and the contents of the warning event on the monitor using text data contained in the warning information (step S1710).

Then, the registered device determines whether a warning by voices is possible or not (step S1711). If a warning by voices is possible, the warning output unit 1607 outputs beep sounds, melodies, voice messages and the like corresponding to the type and the contents of the warning event from the speaker using audio data contained in the warning information (step S1712).

Each of the electronic devices 1501 through 1509 determines whether the warning status has been released or not from the time when the warning command was sent to each registered device until a predetermined time has passed (step S1713). If the warning status has been released until the passage of the predetermined time, each of the electronic devices 1501 through 1509 transmits a warning releasing command indicating that the warning status has been released to the registered device (step S1714). The registered device with the sleep mode as the operational mode prior to receiving the warning command changes its own operational mode to the sleep mode again after receiving the warning releasing command (step S1715).

If it is determined that there is no registered device (step S1703) or if the warning status has not been released after the passage of the predetermined time (step S1713), each of the electronic devices 1501 through 1509 broadcasts the above-mentioned warning command in order to transmit the above-mentioned warning command to the devices other than the registered devices (step S1716).

The registered device having received the warning command determines whether its own operational mode is the on mode or the sleep mode (step S1717). The registered device determining that the mode is the sleep mode automatically changes its own operational mode to the on mode (step S1718).

The device receiving the warning command determines whether a warning by images is possible or not (step S1719). If a warning by images is possible, the warning output unit 1607 displays still images, animation images and the like representing the type and the contents of the warning event on the monitor using image data contained in the warning information (step S1720).

The device then determines whether a warning by characters is possible or not (step S1721). If a warning by characters is possible, the warning output unit 1607 displays a text message and the like describing the type and the contents of the warning event on the monitor using text data contained in the warning information (step S1722).

The device then determines whether a warning by voices is possible or not (step S1723). If a warning by voices is possible, the warning output unit 1607 outputs beep sounds, melodies, voice messages and the like corresponding to the type and the contents of the warning event from the speaker using audio data contained in the warning information (step S1724).

Each of the electronic devices 1501 through 1509 determines whether the warning status has been released or not since it broadcast the warning command until the passage of the predetermined time (step S1725). If the warning status has been released until the predetermined time passes, each of the electronic devices 1501 through 1509 broadcasts a warning releasing command indicating that the warning status has been released (step S1726). The registered device with the sleep mode as the operational mode prior to receiving the warning command changes its own operational mode to the sleep mode again after receiving the warning releasing command (step S1727).

On the other hand, if the warning status has not been released in a predetermined time, each of the electronic devices 1501 through 1509 determines that a user is out. Then, it checks the management table of the destination managing unit 1609 and transmits the warning command to the hand-held terminals 1513 connected to the external network 1511 (step S1728). If a plurality of hand-held terminals 1513 are registered in the management table, the warning command is transmitted in accordance with the priority sequence set by a user. The warning command transmitted from each of the electronic devices 1501 through 1509 is once received by the home server 1510 and transmitted to the hand-held terminals 1513 designated by the warning command from the home server 1510.

The hand-held terminals 1513 having received the warning command determines whether a warning by images is possible or not, whether a warning by characters is possible or not and whether a warning by voices is possible or not and warns of the occurrence of the warning event by at least one of images, characters and voices (step S1729).

Each of the electronic devices 1501 through 1509 determines whether the warning status has been released or not since the transmission of the warning command to each registered device until the passage of the predetermined time (step S1730). The release of the warning status is performed by the warning confirming command transmitted from the hand-held terminals 1513. If the warning status has been released until the passage of the predetermined time, each of the electronic devices 1501 through 1509 transmits the warning releasing command indicating that the warning status has been released to the hand-held terminals 1513 and finishes the processing.

On the other hand, if the warning status has not been released after the passage of the predetermined time, each of the electronic devices 1501 through 1509 checks the management table of the destination managing unit 1609 and determines whether a hand-held terminal 1513 with the second highest priority exists or not (step S1731). If a hand-held terminal 1513 with the second highest priority exists, the processing proceeds to step S1728 and the warning command is transmitted to the hand-held terminal 1513.

If a hand-held terminal 1513 with the second highest priority does not exist, each of the electronic devices 1501 through 1509 notifies a management company, a security company, a public organization and the like with which a user has a contract and finishes the processing (step S1732).

As described above, in accordance with the domestic network system of the third embodiment, each of the electronic devices 1501 through 1509, upon detecting the occurrence of a status that should be warned a user of (i.e., a warning event), can notify a user of the occurrence of a warning event in accordance with the order of (1) the device itself that detected the warning event, (2) registered devices registered in the device that detected the warning event, (3) electronic devices other than the registered devices and (4) hand-held terminals 1513 connected to the external network 1511. With such a configuration, a user in a distant place from a device can be certainly warned of changes in the status having occurred in the device.

In addition, in accordance with the domestic network system of the third embodiment, if a plurality of hand-held terminals 1513 for notifying a user of the occurrence of a warning event are registered, a user can be notified of the occurrence in accordance with the priority sequence set by the user in advance. With such a configuration, a user who is most anxious of the occurrence of a warning event can be precisely notified of the occurrence.

Moreover, in accordance with the domestic network system of the third embodiment, if a warning status is not released even if the occurrence of a warning event is notified all the registered devices of, a contact can be made to a management company, a security company, a public organization and the like with which a user has a contract. With such a configuration, if a user cannot return home immediately or if a user overlooks a warning from a hand-held terminal 1513, the user can certainly cope with a warning event.

Other Embodiments of the Present Invention

The present invention may be applied to a system composed of a plurality of devises (for example, a host computer, an interface apparatus, a reader, a printer or the like) or may be applied to an apparatus composed of one device.

In addition, an implementation by supplying a program code of software for realizing the functions of the above-mentioned embodiments to a computer in an apparatus or a system connected to the above-mentioned each type of devices and causing the above-mentioned each type of devices operate in accordance with the program stored in the computer (a CPU or a MPU) in the system or the apparatus in order to cause each type of devices operate for realizing the functions of the above-mentioned embodiments is also included in the category of the present invention.

In addition, in this case, since the above-mentioned program code itself of the software realizes the functions of the above-mentioned embodiments, the present invention comprises the program code itself and unit for supplying the program code to the computer, for example, a storage medium for storing such a program code. As a storage medium for storing such a program code, for example, a floppy disc, a hard disc, an optical disc, a magneto optical disc, a CD-ROM, a magnetic tape, a nonvolatile memory card, a ROM and the like can be used.

In addition, with a computer executing a supplied program code, it goes without saying that, not only the functions of the above-mentioned embodiments are realized, but also such program code is included in the embodiments of the present invention even if the functions of the above-mentioned embodiments are realized by the program code cooperating with the OS (Operating System) operating in the computer or other application software and the like.

Moreover, it goes without saying that, the program code is also included in the present invention in case, after the supplied program code is stored in a memory provided in a function extension board of the computer or a function extension unit connected to the computer, a CPU and the like provided in the function extension board or the function extension unit performs a part or all of the actual processing based on the instruction of the program code and the functions of the above-mentioned embodiments are realized by the processing.

Further, the present invention may be embodied in other specific forms without departing from essential characteristics thereof.

For example, although an example in which electronic devices such as a personal computer, stereo equipment, a telephone, a digital television, a washing machine, a refrigerator and a door phone are connected to the domestic network system is described in each of the above-mentioned embodiments, devices such as a micro wave, a rice cooker, a bath tub, a facsimile, a video recorder incorporating a camera, a digital set-top box may be connected.

In addition, although an example in which a digital network conforming to the IEEE1394-1995 standard and its extended standard is utilized is described in each of the above mentioned embodiments, the present invention can be realized by using a digital network such as a USB (Universal Serial Bus) and a wireless LAN.

Therefore, the above-mentioned embodiments are merely examples in all respect, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. An electronic device, comprising:
 a detecting unit adapted to detect whether a warning status has occurred;
 a warning unit adapted to notify to a user that the warning status has occurred; and
 a communication unit adapted to transmit warning information indicating that the warning status has occurred,
 wherein, if the warning status is not released within a predetermined time, the communication unit transmits the warning information to a registered device that has been registered by the user as a device that is to receive the warning information,
 if the warning status is not released in spite of transmitting the warning information to the registered device and if it is determined that the user is not near the electronic device, the communication unit transmits the warning information to one or more hand-held terminals in an external network according to a predetermined order, and
 if the warning status is released within a predetermined time having elapsed from the transmission of the warning information to the hand-held terminal, the communication unit transmits warning released information indicating that the warning status has been released to the hand-held terminal.

2. The electronic device according to claim 1, wherein, before it is determined whether or not the user is near the electronic device, the communication unit transmits the warning information to an unregistered device that has not been registered by the user as a device that is to receive the warning information.

3. The electronic device according to claim 2, wherein, if the warning status is not released in spite of transmitting the warning information to the unregistered device and if it is determined that the user is not near the electronic device, the communication unit transmits the warning information to the one or more hand-held terminals according to the predetermined order.

4. The electronic device according to claim 1, wherein the warning information comprises at least one of image data, text data and audio data.

5. The electronic device according to claim 1, wherein the electronic device and the registered device are connected to a domestic network.

6. A method for an electronic device, comprising the steps of:
   detecting whether a warning status has occurred; and
   notifying a user that the warning status has occurred;
   wherein, if the warning status is not released within a predetermined time, transmitting warning information to a registered device that has been registered by the user as a device that is to receive the warning information,
   if the warning status is not released in spite of transmitting the warning information to the registered device and if it is determined that the user is not near the electronic device, transmitting the warning information to one or more hand-held terminals in an external network according to a predetermined order, and
   if the warning status is released within a predetermined time having elapsed from the transmission of the warning information to the hand-held terminal, transmitting warning released information indicating that the warning status has been released to the hand-held terminal.

7. The method according to claim 6,
further comprising the step of:
   before it is determined whether or not the user is near the electronic device, transmitting the warning information to an unregistered device that has not been registered by the user as a device that is to receive the warning information.

8. The method according to claim 7, further comprising the step of:
   if the warning status is not released in spite of transmitting the warning information to the unregistered device and if it is determined that the user is not near the electronic device, transmitting the warning information to the one or more hand-held terminals according to the predetermined order.

9. The method according to claim 6, wherein the warning information comprises at least one of image data, text data and audio data.

10. The method according to claim 6, wherein the electronic device and the registered device are connected to a domestic network.

* * * * *